Patented Dec. 22, 1936

2,065,110

UNITED STATES PATENT OFFICE 2,065,110

METHOD OF PREPARING METAL PICRATES

John C. Bird, Philadelphia, Pa., assignor to John Wyeth & Brother, Incorporated, Philadelphia, Pa., a corporation of Delaware No Drawing. Application May 9, 1934, Serial No. 724,825

9 Claims. (Cl. 260—13)

The object of this invention is the preparation of metal picrates.

The compounds of picric acid such as its organic ethers and the metal picrates, more particularly silver picrate, have valuable medicinal and antiseptic properties. However, in the preparation of such compounds for use or for dispensing, for example, in aqueous solution, the low solubility of certain metal picrates and particularly of silver picrate makes the preparation of materials containing such compounds difficult and expensive, since concentrated solutions cannot be readily prepared or employed. Thus, silver picrate is soluble in water only to the extent of about one per cent and to secure even this low solubility, the application of moderate heat may be necessary. Some compounds, particularly the silver compound, are unstable in aqueous solution, particularly when heated, decomposing with the formation of reduction or oxidation products resulting in turbidity. On exposure to light, decomposition of the silver salt is more rapid with formation of silver oxide, metallic silver and the like. Such solutions, which are necessarily dilute, are thus not well adapted for storage or for economical commercial use.

In accordance with this invention, it has been found that silver picrate has a high solubility in ethers of ethylene and diethlyene glycol, and particularly the monoethyl ethers. Thus it has been found that silver picrate has a solubility in diethylene glycol monoethyl ether of about 50%, and in the monoethyl ether of ethylene glycol of about 25%. Furthermore, as the solution is nonaqueous, it does not readily undergo hydrolysis or decomposition although it is preferable, of course, that it be not exposed to light for long periods.

Such solutions containing in excess of 1% of the picrate, may be readily prepared directly from silver picrate and one of the ethers referred to when silver picrate is obtainable. However, the high solubility of silver picrate in the monoalkyl ethers above referred to provides a ready means for the production of the compound directly in the presence of the said monoalkyl ethers, for example, from silver oxide and picric acid. For example, such a solution may be readily made as follows:

Silver oxide, which may be prepared by precipitation from aqueous solution of silver nitrate by an alkali, with subsequent careful washing and thorough draining so that it is substantially free of excessive water, is thoroughly mixed with diethylene glycol monoethyl ether in a suitable container. The container and any mechanical devices that are employed in connection with the manufacture are preferably of non-metallic inert materials such as glass, enamel or wood.

Picric acid is now added to the mixture of the silver oxide and the ether, the proportions being so controlled that there is a slight excess of silver oxide. The mixture is preferably warmed, say to about 90 C. Rapid reaction takes place and silver picrate forms and goes into solution. When the reaction is completed, the solution is neutral or very slightly alkaline with a faint turbidity due to the slight excess of silver oxide. The solution is then filtered and allowed to cool. While solutions containing a concentration of silver picrate up to about 50% may be thus prepared, I prefer to control the proportions of the solvent and of the reagents so that the final solution has a silver picrate concentration of about 20% for convenience in dispensing.

The solution thus dispensed may be conveniently employed in the preparation of aqueous solutions containing up to 1% of silver picrate, at the convenience and according to the desires of the dispenser.

The solution of silver picrate in the ethylene glycol ether hereinbefore described may be conveniently employed in the production of silver picrate in solid or crystalline form. For such purpose, the proportions of the monoalkyl ether solvent are preferably controlled so that a solution is obtained, of between 20 and 40%. The silver picrate may be caused to crystallize out by the addition of water. Thus with the more concentrated solutions of silver picrate in the monoethyl ether, on the addition of water, preferably up to about twice the amount in volume of the picrate solution, the silver picrate rapidly crystallizes out in shining golden yellow needles. These crystals are filtered off or drained from excess solvent, washed with ice water and dried. More dilute solutions of the silver picrate may be employed, if desired, but in general the more concentrated solutions are preferred when solid silver picrate is to be prepared.

The solutions of silver picrate in a diethylene glycol monoalkyl ether, and particularly the monoethyl ether, may be employed in the rapid and convenient preparation of other compounds of picric acid, such as other metal picrates or ethers of picric acid. This may be effected by causing the silver picrate, in the diethylene glycol monoalkyl ether solution to react upon a metal halide or an organic halide such as the simple hydrocarbon halides having alkyl, aryl, alkaryl and cyclic radicals.

For example, mercuric chloride or calcium chloride may be dissolved in diethylene glycol monoethyl ether and the solution added to a solution of silver picrate in the same ether, equivalent proportions of the reacting compounds being provided. Silver chloride is precipitated, leaving in solution the mercuric or calcium picrates, which may be employed in solution or removed, for example, by precipitation with water.

Similarly, by using diethylene glycol monoethyl ether solutions of organic halides, and particularly of hydrocarbon halides, such as methyl chloride, ethyl chloride, benzyl chloride, phenyl chloride and cyclohexyl chloride, and adding them to a solution of silver picrate in equivalent proportions, the corresponding picrates are produced. By using dihalides in a similar manner the dipicrates may be formed.

Although the chlorides have been referred to hereinbefore as examples of the metal and organic halides that may be employed, it will be understood that other halides, such as the bromides and iodides may be employed with similar results.

As in the case of the preparation of the metallic picrates, the organic picrates may be separated by adding water to the diethylene glycol monoalkyl ether solution. When the latter becomes turbid, the picrate generally crystallizes out on standing. Other means of separating out the picrate may be employed, if desired.

I claim:

1. The method of preparing compounds of picric acid by a metathetical reaction which comprises adding to a solution of silver picrate in diethylene glycol monoethyl ether containing in excess of 1% of silver picrate a solution of a metal halide in said ether, the metal of the metal halide being capable of replacing the silver of the silver picrate and the halogen of which is capable of combining with silver to form an insoluble precipitate.

2. The method of preparing compounds of picric acid which comprises adding to a solution of silver picrate in diethylene glycol monoethyl ether containing in excess of 1% of silver picrate a solution of mercuric chloride in said ether.

3. The method of preparing compounds of picric acid which comprises adding to a solution of silver picrate in diethylene glycol monoethyl ether containing in excess of 1% of silver picrate a solution of calcium chloride in said ether.

4. The method of preparing compounds of picric acid by a metathetical reaction which comprises adding to a solution of silver picrate in a lower glycol ether a metal halide, the metal of the metal halide being capable of replacing the silver of the silver picrate and the halogen of which is capable of combining with silver to form an insoluble precipitate.

5. The method of preparing compounds of picric acid by a metathetical reaction which comprises adding to a solution of a lower diethylene glycol monoalkyl ether a metal halide, the metal of the metal halide being capable of replacing the silver of the silver picrate and the halogen of which is capable of combining with silver to form an insoluble precipitate.

6. The method of preparing compounds of picric acid by a metathetical reaction which comprises adding to a solution of silver picrate in a lower diethylene glycol monoalkyl ether containing in excess of 1% of silver picrate a solution of a metal halide in said ether, the metal of the metal halide being capable of replacing the silver of the silver picrate and the halogen of which is capable of combining with silver to form an insoluble precipitate.

7. The method of preparing compounds of picric acid which comprises adding to a solution of silver picrate in a lower diethylene glycol monoalkyl ether containing in excess of 1% of silver picrate a solution of mercuric chloride in said ether.

8. The method of preparing compounds of picric acid which comprises adding to a solution of silver picrate in a lower diethylene glycol monoalkyl ether containing in excess of 1% of silver picrate a solution of calcium chloride in said ether.

9. The method of preparing compounds of picric acid which comprises adding to a solution of silver picrate in a lower diethylene glycol mono-alkyl ether containing in excess of 1% of silver picrate a solution of a metal halide in said ether selected from the class consisting of mercuric and calcium chlorides.

JOHN C. BIRD.